US012017245B2

(12) United States Patent
Biegelsen et al.

(10) Patent No.: US 12,017,245 B2
(45) Date of Patent: Jun. 25, 2024

(54) ELECTROSPRAY FOG GENERATION FOR FOUNTAIN SOLUTION IMAGE GENERATION

(71) Applicant: Palo Alto Research Center Incorporated, Palo Alto, CA (US)

(72) Inventors: David K. Biegelsen, Portola Valley, CA (US); Kathryn F. Murphy, Redwood City, CA (US)

(73) Assignee: Xerox Corporation, Norwalk, CT (US)

( * ) Notice: Subject to any disclaimer, the term of this patent is extended or adjusted under 35 U.S.C. 154(b) by 725 days.

(21) Appl. No.: 17/155,347

(22) Filed: Jan. 22, 2021

(65) Prior Publication Data

US 2022/0234057 A1 Jul. 28, 2022

(51) Int. Cl.

| | |
|---|---|
| ***H01J 49/16*** | (2006.01) |
| ***B05B 5/025*** | (2006.01) |
| ***B41F 7/32*** | (2006.01) |
| ***G03G 15/22*** | (2006.01) |

(52) U.S. Cl.

CPC .............. *B05B 5/0255* (2013.01); *B41F 7/32* (2013.01); *G03G 15/22* (2013.01); *H01J 49/167* (2013.01)

(58) Field of Classification Search

CPC ..................................................... H01J 49/167

See application file for complete search history.

(56) References Cited

U.S. PATENT DOCUMENTS

| | | | |
|---|---|---|---|
| 2,551,582 A | 5/1951 | Carlson | |
| 7,150,859 B2 | 12/2006 | Yamagata et al. | |
| 7,199,364 B2 | 4/2007 | Thakur | |
| 7,928,368 B2 | 4/2011 | Nissila et al. | |
| 10,112,382 B2 | 10/2018 | Mayo et al. | |
| 2002/0000516 A1 * | 1/2002 | Schultz ................... | H01J 49/04 250/288 |
| 2006/0060769 A1 | 3/2006 | Bousse et al. | |
| 2011/0147576 A1 * | 6/2011 | Wouters ................ | H01J 49/167 250/288 |
| 2020/0353742 A1 | 11/2020 | Williams et al. | |

OTHER PUBLICATIONS

"Taylor Cone", Wikipedia, Retrieved from "https://en.wikipedia.org/w/index.php?title=Taylor_cone&oldid=980808131"; page last edited on Sep. 28, 2020, at 15:51 (UTC).

(Continued)

*Primary Examiner* — Joseph L Williams

(74) *Attorney, Agent, or Firm* — Ortiz & Lopez, PLLC; Luis M. Ortiz; Kermit D. Lopez

(57) ABSTRACT

An electrospray apparatus and a method of operating the electrospray apparatus can include an array of emitters that can emit a fog of charged droplets, wherein the charged droplets can be produced in a carrier gas by the array of emitters and directed into a development zone of a charge image. Each emitter among the array of emitters can be implemented as a cone-shaped emitter. The array of emitters can be implemented as a cone jet electrospray micro-array that can produce a high liquid concentration of the charged droplets in the carrier gas. The charged droplets can comprise charged fountain solution droplets, and the charge image can be a fountain solution image that can be transferrable to a blanket for control and subsequent ink transfer to a receiving medium.

20 Claims, 3 Drawing Sheets

(56) References Cited

OTHER PUBLICATIONS

"Microfluidics", Wikipedia, Retrieved from "https://en.wikipedia.org/w/index.php?title=Microfluidics&oldid=992156074"; page last edited on Dec. 3, 2020, at 20:14 (UTC).
Anna Zielińska-Jurek, Joanna Reszczyńska, Ewelina Grabowska and Adriana Zaleska, "Nanoparticles Preparation Using Microemulsion Systems", https://www.researchgate.net/publication/262036827; Chapter—Mar. 2012, DOI: 10.5772/2300—Source: InTech.
T. Gemci, R. Hitron, and N. Chigier, "Determination of Individual Droplet Charge in Electrosprays From PDPA Measurements", ILASS-Europe 2002, Zaragoza Sep. 9-11, 2002.

* cited by examiner

ELECTROSPRAY FOG GENERATION FOR FOUNTAIN SOLUTION IMAGE GENERATION

TECHNICAL FIELD

Embodiments relate to electrospray devices, systems, and methods of use. Embodiments further relate to marking and printing systems, including but not limited to variable data lithography systems that use fog development of an electrographic image for the creation of a fountain solution image. Embodiments also relate to imaged liquid layers used for ink printing, or non-ink applications such as 3D layer-by-layer construction using UV curable liquids.

BACKGROUND

Offset lithography is a common method of printing today. For the purpose hereof, the terms "printing" and "marking" may be interchangeable. In a typical lithographic process a printing plate, which may be a flat plate, the surface of a cylinder, belt, and the like, can be formed to have "image regions" formed of hydrophobic and oleophilic material, and "non-image regions" formed of a hydrophilic material. The image regions are regions corresponding to the areas on the final print (i.e., the target substrate) that are occupied by a printing or a marking material such as ink, whereas the non-image regions are the regions corresponding to the areas on the final print that are not occupied by the marking material.

The Variable Data Lithography (also referred to as Digital Lithography or Digital Offset) printing process usually begins with a fountain solution used to dampen a silicone imaging plate on an imaging drum. The fountain solution forms a film on the silicone plate that is on the order of about one (1) micron thick. The drum rotates to an 'exposure' station where a high power laser imager is used to remove the fountain solution at the locations where the image pixels are to be formed. This forms a fountain solution based 'latent image'. The drum then further rotates to a 'development' station where lithographic-like ink is brought into contact with the fountain solution based 'latent image' and ink 'develops' onto the places where the laser has removed the fountain solution. The ink is usually hydrophobic for better adhesion on the plate and substrate. An ultra violet (UV) light may be applied so that photo-initiators in the ink may partially cure the ink to prepare it for high efficiency transfer to a print media such as paper. The drum then rotates to a transfer station where the ink is transferred to a printing medium such as paper. The silicone plate is compliant, so an offset blanket is not used to aid transfer. UV light may be applied to the paper with ink to fully cure the ink on the paper. The ink is on the order of one (1) micron pile height on the paper.

The formation of the image on the printing plate is usually accomplished with imaging modules each using a linear output high power infrared (IR) laser to illuminate a digital light projector (DLP) multi-mirror array, also referred to as the "DMD" (Digital Micromirror Device). The mirror array is similar to what is commonly used in computer projectors and some televisions. The laser provides constant illumination to the mirror array. The mirror array can deflect individual mirrors to form pixels on the image plane to pixel-wise evaporate the fountain solution on the silicone plate and create the fountain solution image. If a pixel is not to be turned on, the mirrors for that pixel can deflect such that the laser illumination for that pixel does not hit the silicone surface, but goes into a chilled light dump heat sink.

Digital printing systems (including digital lithography or digital offset printing systems) can use a fountain solution as discussed above, and can include an imaging member for carrying a fountain solution image on an imaging member, and an image forming unit that can form an electrostatic charge image of a first polarity on the imaging member. Such digital printing systems may also use a developer unit proximate to the imaging member and adapted to form a fog of charged droplets that can be attracted to the electrostatic charge image to form the fountain solution image on the imaging member. An inking system can also be used to apply ink as controlled spatially by the fountain solution image for developing the ink image. Such digital printing systems may also include the use of a developer unit that comprises an inlet for receiving a fountain solution and a discharge forming the fog of charged droplets. The fog of charged droplets may include multiple substantially uniformly sized electrically charged droplets of the fountain solution. An example of fog development for digital offset printing applications is disclosed in U.S. Patent Application Publication No. 20200353743 entitled "Fog Development for Digital Offset Printing Applications", by Williams et al. of the Palo Alto Research Center Incorporated of Palo Alto, Calif., U.S.A., which published on Nov. 12, 2020, and which is incorporated herein by reference in its entirety.

Current fog development uses droplet nebulization and subsequent charging. Nebulization using pressurized carrier gas such as nitrogen or air can produce liquid volume fractions, which can be almost an order of magnitude too small to provide complete coverage at maximum print speeds. An alternative means of charged droplet creation having higher fill factor and narrower droplet size dispersion is desired.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved electrospray apparatus, system, and method of use.

It is another aspect of the disclosed embodiments to provide for an electrospray apparatus that can include an array of emitters (e.g., cone-shaped emitters) that can emit a fog of charged droplets for the creation of a fountain solution image.

It is also an aspect of the disclosed embodiments to provide for imaged liquid layers used for ink printing or non-ink printing applications such as 3D layer-by-layer construction using UV curable liquids.

It is a further aspect of the disclosed embodiments to provide for a cone jet electrospray micro-array that can produce a high liquid concentration of droplets in a carrier gas.

The aforementioned aspects and other objectives and advantages can now be achieved as described herein. In an embodiment, an electrospray apparatus can include an array of emitters that can emit a fog of charged droplets, wherein the charged droplets can be produced in a carrier gas by the array of emitters and directed into a development zone of a charge image.

In an embodiment of the electrospray apparatus, each emitter among the array of emitters can comprise a cone-shaped emitter.

In an embodiment of the electrospray apparatus, the array of emitters can comprise a cone jet electrospray micro-array that can produce a high liquid concentration of the charged droplets in the carrier gas.

In an embodiment of the electrospray apparatus, the charged droplets can comprise charged fountain solution droplets.

In an embodiment of the electrospray apparatus, the charge image can comprise a fountain solution image that is transferrable to a blanket for control and subsequent ink transfer to a receiving medium.

In an embodiment of the electrospray apparatus, the carrier gas can comprise a slow moving carrier gas, and the charged droplets can be slowed in the slow moving carrier gas by viscous drag.

In an embodiment of the electrospray apparatus, the array of emitters can electro-spray an insulating liquid as the fog of the charged droplets by the addition of a charge control agent.

An embodiment of the electrospray apparatus can further include a coaxial droplet generator, and a volatile conducting liquid shell, wherein the array of cone-shaped emitters electro-sprays an insulating liquid as the fog of the charged droplets by the coaxial droplet generator with the volatile conducting liquid shell.

In an embodiment, an electrospray apparatus can include: an array of cone-shaped emitter that emits a fog of charged droplets, wherein the charged droplets are produced in a carrier gas by the array of emitters and directed into a development zone of a charge image, and wherein the array of emitters comprises a cone jet electrospray micro-array that produces a high liquid concentration of the charged droplets in the carrier gas.

In an embodiment, a method of operating an electrospray apparatus can involve: emitting a fog of charged droplets from an array of emitters, producing the charged droplets in a carrier gas by the array of emitters, and directing the charged droplets into a development zone of a charge image.

In an embodiment of the method, each emitter among the array of emitters can comprise a cone-shaped emitter.

In an embodiment of the method, the array of emitters can comprise a cone jet electrospray micro-array that can produce a high liquid concentration of the charged droplets in the carrier gas.

In an embodiment of the method, the charged droplets can comprise charged fountain solution droplets.

In an embodiment of the method, the charge image can comprise a fountain solution image that is transferrable to a blanket for control and subsequent ink transfer to a receiving medium.

In an embodiment of the method, the carrier gas can comprise a slow moving carrier gas, and the charged droplets can be slowed in the slow moving carrier gas by viscous drag.

In an embodiment of the method, the array of emitters can electro-spray an insulating liquid as the fog of the charged droplets by the addition of a charge control agent.

An embodiment of the method can further involve the use of a coaxial droplet generator, and a volatile conducting liquid shell, wherein the array of cone-shaped emitters can electro-spray an insulating liquid as the fog of the charged droplets by the coaxial droplet generator with the volatile conducting liquid shell.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description of the embodiments, serve to explain the principles of the embodiments.

DETAILED DESCRIPTION

Figure 1:
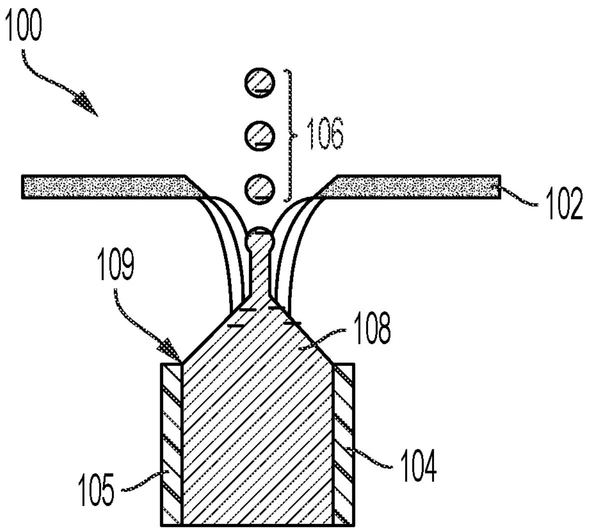
FIG. 1 illustrates a side cut-away view of a cone jet formed by electrostatic forces on a conductive liquid at the exit of a fine channel, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment", "in an embodiment", or "in an example embodiment" and variations thereof as utilized herein may or may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The term 'fountain solution' as utilized herein can relate to a material, which can adhere to a substrate and split in an inking nip to reject ink from adhering to the substrate. In some situations the fountain solution can adhere to a substrate and bind ink, which does not otherwise adhere to the substrate. Below we will speak of the former use, however it should be considered as applying in either modality. The fluid (i.e., liquid, solution, etc) referred to herein can be a water or aqueous-based fountain solution, which can be applied in an airborne state such as by vapor or by direct contact with a wetted imaging member through a series of rollers for uniformly wetting a member with the fluid. The solution or fluid can be non-aqueous composed of, for example, silicone fluids (e.g., such as D3, D4, D5, OS10, OS20, OS30 and the like), Isopar fluids, and polyfluorinated ether or fluorinated silicone fluid.

The modifier "about" or "approximately" used in connection with a quantity may be inclusive of the stated value and can have a meaning dictated by the context (for example, it may include at least the degree of error associated with the measurement of the particular quantity). When used with a specific value, it should also be considered as disclosing that value. For example, the terms "about 2" or "approximately 2" also discloses the value "2" and the range "from about 2 to about 4" (and similarly, "from approximately 2 to approximately 4) may also disclose the range "from 2 to 4."

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations. The terms "first," "second," and the like, herein do not denote any order, quantity, or importance, but rather can be used to distinguish one element from another. The terms "a" and "an" herein may not denote a limitation of quantity, but rather can denote the presence of at least one of the referenced items.

The term "printing device", "printing system", or "digital printing system" as used herein can refer to a digital copier or printer, scanner, image printing machine, digital production press, document processing system, image reproduction machine, bookmaking machine, facsimile machine, multi-function machine, or the like and can include several marking engines, feed mechanism, scanning assembly as well as other print media processing units, such as paper feeders, finishers, and the like. The digital printing system can handle sheets, webs, marking materials, and the like. A digital printing system can place marks on any surface, and the like and is any machine that can read marks on input sheets; or any combination of such machines.

The term "printing device", "printing system", or "digital printing system" and variations thereof as used herein can refer to devices and systems based on ink printing or which can provide imaged liquid layers for applications other than ink printing, such as, for example, three-dimensional (3D) layer-by-layer construction using ultraviolet (UV) curable liquids.

As will be explained in greater detail herein, the disclosed embodiments can be used to provide a fountain solution image, which can be transferred to a blanket to control inking and subsequent ink transfer to a receiving medium. The same method and embodiments can also be used to provide imaged liquid layers for applications other than ink printing, such as the 3D layer-by-layer construction using UV curable liquids referred to above. As will be discussed in more detail, the disclosed embodiments can use a cone jet electrospray micro-array to produce a high liquid concentration of droplets in a carrier gas.

FIG. 1 illustrates a side cut-away view of a cone jet 100 that can be formed by electrostatic forces on a conductive liquid 108 at the exit 109 of a fine channel formed between a channel wall 104 and a channel wall 105, in accordance with an embodiment. The cone jet 100 can be based on a Taylor cone, which can be produced above a threshold voltage that facilitates emission of the cone jet 100. Note that the term 'Taylor cone' as used herein relates to a cone observed in electrospinning, electrospraying and hydrodynamic spray processes from which a jet of charged particles emanates above a threshold voltage. The cone jet 100 can thus function as an emitter of the conductive liquid 108.

The cone jet 100 can break up into, for example, a group of droplets 106 having a narrow distribution of diameters and droplet charge controlled by the voltage 102 and a liquid feed rate. Note that the channel walls 104 and 105 can function as ground with respect to the voltage 102 (which may be a threshold voltage).

Note that if the liquid utilized is a highly insulating fluid, such as D4, a charge control agent, such as AOT, can be added to provide the desired conductance. Note that the term 'AOT' as utilized herein can refer to a twin tailed, anionic surfactant with a sulfosuccinate head group stabilized as a salt by a sodium cation. The AOT molecule has an inverted conical shaped structure and has proven to be an effective emulsifier, thus finding a wide range of applications as well as numerous intensive studies.

Figure 2:
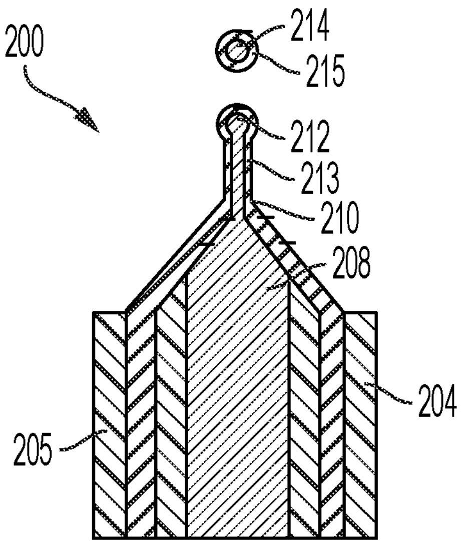
FIG. 2 illustrates a side cut-away view of a coaxial flow droplet generator, in accordance with an embodiment.

An alternative to doping the liquid with a charge control agent can involve the use of a coaxial flow droplet generator. FIG. 2 illustrates a side cut-away view of a coaxial flow droplet generator 200, in accordance with an embodiment. The coaxial flow droplet generator 200 depicted in FIG. 2 represents an alternative form of the emitter (cone jet 100) shown in FIG. 1. Note that as utilized herein, identical or similar parts or elements are generally indicated by identical reference numerals.

A highly volatile conducting liquid such as the liquid 208 shown in FIG. 2 can be used to sheath the emitted jet and produce thinly sheathed droplets such as droplet 212 and droplet 214. The droplet 212 has an outer sheath 213, and the droplet 214 has an outer sheath 215. The outer sheaths 213 and 215 can rapidly evaporate leaving charged droplets 212 and 214 originating from the insulating fluid 208. The outer sheaths 213 and 215 can originate from a layer 210 of, for example alcohol that contacts channel walls 204 and 205, which can also function as ground.

Figure 3:
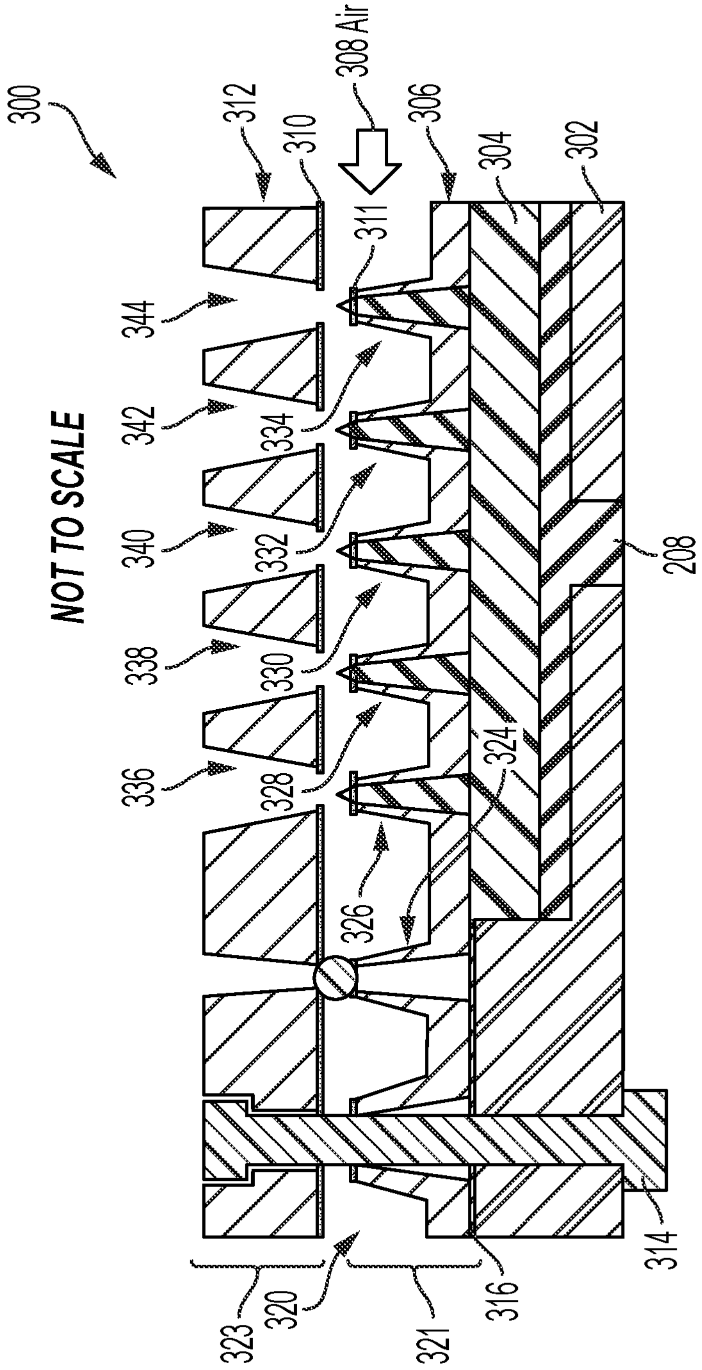
FIG. 3 illustrates a side cut-away view of an array of cone-shaped emitters, in accordance with an embodiment.

FIG. 3 illustrates a side cut-away view of an array 300 of cone-shaped emitters, in accordance with an embodiment. The array 300 can include a cone-shaped emitter 320, a cone-shaped emitter 324, a cone-shaped emitter 326, a cone-shaped emitter 328, a cone-shaped emitter 330, a cone-shaped emitter 332, and a cone-shaped emitter 334. Each of the emitters 320, 324, 326, 328, 330, 332, and 334 can be configured as an emitter such as the cone-jet 100 shown in FIG. 1 or the coaxial flow droplet generator 200 depicted in FIG. 2.

In the embodiment depicted in FIG. 3, the fluid 208 can be disposed in a layer proximate to a filter 304. The fluid 208 can be filtered through the filter 304 and can then enter an orifice in each of the emitters 326, 328, 330, 332, and 334. The orifices in each of the emitters 326, 328, 330, 332, and 334 can be configured from, for example, a layer formed from a doped Si material, which can also function as a ground. The emitters 326, 328, 330, 332, and 334 can be formed in a jet plate 321 that can include the emitters 326, 328, 330, 332, and 334 and a cone shaped component 320 and a cone shaped component 324. Each of the emitters 326, 328, 330, 332, and 334 can function as a cone jet electrospray. The cone shaped component 320 and the cone shaped component 324 can be disposed above a layer 316 that can function as a gasket. The layer 316 can be disposed above a layer 302 that can function as a housing.

An extractor plate 323 can be located proximate to the jet plate 321 and can include a group of extractors including, for example, an extractor 336, an extractor 338, an extractor 340, an extractor 342, and extractor 344. The extractor plate 323 can include a layer 310, which can be formed from oxide or oxynitride. The jet plate 321 can include a similar layer 311, which may also be formed from oxide or oxynitride. The layer 310 and the layer 311 can each function as an insulating layer.

The extractor plate 321 can be configured from a layer of, for example, doped silicon material (Hi +V). Note that in FIG. 3, an arrow 308 can indicate the direction of airflow between the extractor plate 323 and the jet plate 321. The extractor plate 323 can be formed from the layer 312 and jet plate 321 can be formed from the layer 306.

Two silicon wafers (e.g., layer 312 and the layer 306) can be processed using deep reactive ion etching or other means to provide the jet plate 321 and an extractor plate 323. The optional insulating layers 310 and 311 can be used as etch stops and to provide well defined openings for the orifices shown in FIG. 3. Accurate registration and spacing between the jet plate 321 and an extractor plate 323, which are critical for controlled operation, can be achieved using, for example insulating balls. The jet plate 321 and an extractor plate 323 can be clamped together using insulating screws configured, for example, from PEEK, such as the screw 314 shown in FIG. 3. Note that Polyether ether ketone (PEEK) is a colorless organic thermoplastic polymer in the polyaryletherketone (PAEK) family, used in engineering applications.

The fluid 208 to be used can be brought into a plenum under modest controlled pressure and passed through the filter 304 into the high aspect ratio orifices located in each of emitters 326, 328, 330, 332, and 334. The impedance of the orifices is the highest impedance in the fluidic path and can guarantee that all jets are created under identical flow conditions. Slightly pressurized air can be used to help carry the charged droplets (as discussed and illustrated previously with respect to FIG. 1 and FIG. 2) away from the extractor plate 323 after exiting the top orifices.

The array 300 of jets can be, for example, a one-dimensional pattern or two-dimensional pattern. Typical orifice diameters may be 10-50 microns for the jet plate 321 and 50-100 microns for the extractor plate 323. A pitch between jets can be on the order of 100 microns. Note that various alternative materials such as glass, polymers, etc. can be used to fabricate the disclosed arrays. However, silicon is preferred because of its ease of fabrication, low cost and high rigidity. The two plates 321 and 323 should have the same coefficient of thermal expansion to maintain jet/extractor registration.

Figure 4:
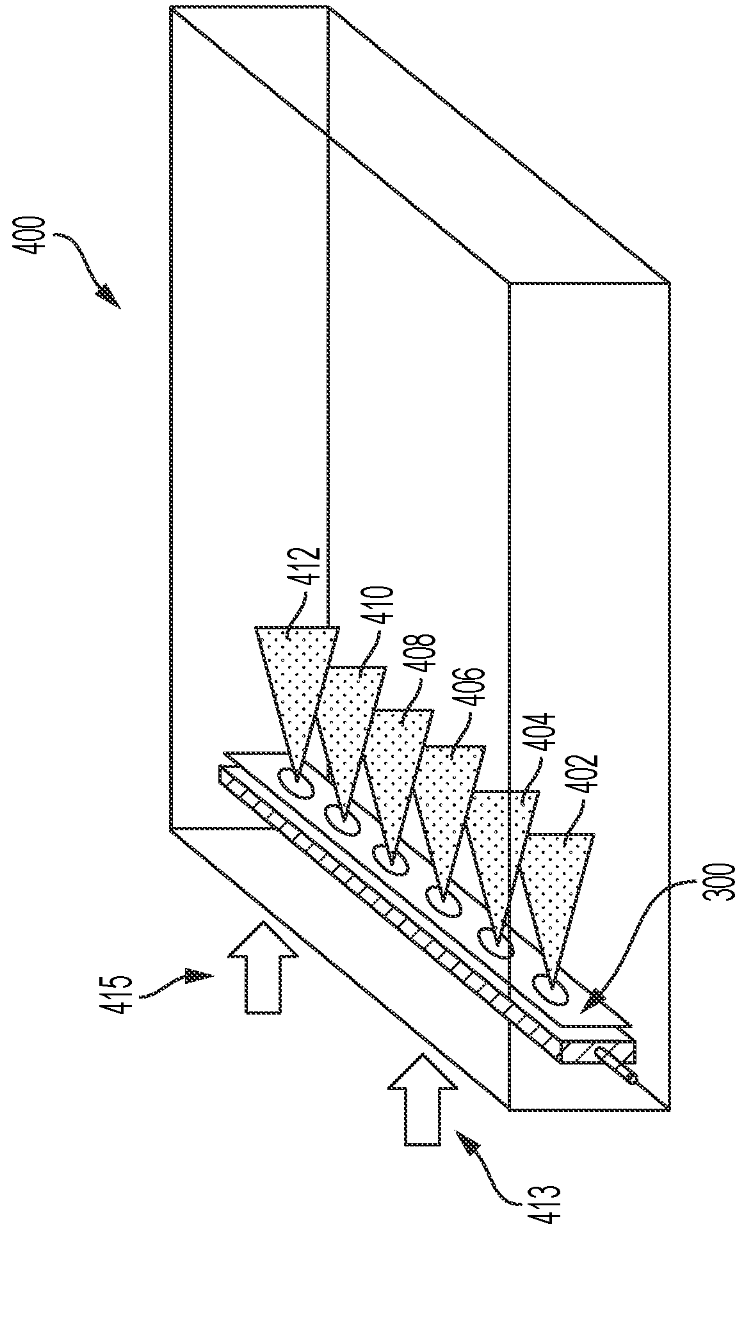
FIG. 4 illustrates side perspective view of an electrospray apparatus that includes the array of cone-shaped emitters depicted in FIG. 4, in accordance with an embodiment.

FIG. 4 illustrates side perspective view of an electrospray apparatus 400 that includes the array 300 of cone-shaped emitters 326, 328, 330, 332, 334 depicted in FIG. 4, in accordance with an embodiment. As shown in the embodiment in FIG. 4 the array 300 of cone-shaped emitters can generate a group of electrospray droplets 402, 404, 406, 408, 410, and 412. Note that the arrows 413 and 415 shown in FIG. 4 represent the direction of airflow, similar to the arrow 308 shown in FIG. 3.

FIG. 4 thus depicts such a cone jet array 300 electrospraying charged droplets into a slow moving air stream. The droplets can be slowed to the ambient air velocity by viscous drag in a distance of an order of, for example, 3 cm. [e.g. see "Determination of individual droplet charge in electrosprays from PDPA measurements" by Gemci et al., ILASS-Europe 2002, Zaragoza 9-11 September 2002, referred to as 'Gemci et al', and which is incorporated herein by reference in its entirety.]

From the experiments disclosed in Gemci et al. for a droplet diameter of 1 micron, a flow rate per nozzle can be ~1 ml/min and the drops can be charged to the Rayleigh limit of ~30,000 charges. To provide a 100% coverage ~200 nm thick on an electrostatic imaging surface moving at 1 m/s, a volume of ~0.002 cc/s may be needed per cm in the cross-process direction. Therefore ~120 jets per cm may be required. For a single linear array of jets, an inter-jet spacing of ~80 microns is indicated. For a two dimensional array of jets a larger inter-jet gap can be used. For a 1 mm high channel in the development zone the resulting fill factor of 0.0002 can match the requirements for full development. To allow higher process speeds and to allow for a fraction of droplets to plate out on the walls, an excess of jets, for example, ~200 per cm cross-process, may be used. For example, an array comprising three staggered rows of 70 jets each with ~100 micron inter-jet spacing can be used. It can be appreciated that the aforementioned measurements and parameters are not considered limited features of the disclosed embodiments, but are referred to herein for illustrative and exemplary purposes.

As discussed previously, current fog development uses droplet nebulization and subsequent charging. Nebulization using pressurized carrier gas such as nitrogen or air can produce liquid volume fractions, which may be almost an order of magnitude too small to provide complete coverage at maximum print speeds. An alternative means of charged droplet creation having higher fill factor and narrower droplet size dispersion is desired. The disclosed embodiments can thus meet this goal.

Electrospray can produce a nearly monodisperse, size-selectable distribution of highly charged droplets, which can be injected into a low carrier gas volume. High liquid fill factors can thus be provided with the added benefit of the high droplet charging and narrow size distribution offered by the disclosed embodiments. A photolithographically generated array of cone jet emitters is thus disclosed herein, which can produce the desired fog.

A configuration and means of production of a cone jet electrospray array and its coupling to a low volume carrier gas have been described with respect to the embodiments. The array may be fabricated most easily from silicon wafers. Furthermore, the ejected droplets can be slowed in a slow moving carrier gas by viscous drag, and then directed into the development zone of a charge image.

Based on the foregoing, it can be appreciated that a number of embodiments including preferred and alternative embodiments are disclosed herein. For example, in a preferred embodiment, an electrospray apparatus can include an array of emitters that can emit a fog of charged droplets, wherein the charged droplets can be produced in a carrier gas by the array of emitters and directed into a development zone of a charge image.

In an embodiment of the electrospray apparatus, each emitter among the array of emitters can comprise a cone-shaped emitter.

In an embodiment of the electrospray apparatus, the array of emitters can comprise a cone jet electrospray micro-array that can produce a high liquid concentration of the charged droplets in the carrier gas.

In an embodiment of the electrospray apparatus, the charged droplets can comprise charged fountain solution droplets.

In an embodiment of the electrospray apparatus, the charge image can comprise a fountain solution image that is transferrable to a blanket for control and subsequent ink transfer to a receiving medium.

In an embodiment of the electrospray apparatus, the carrier gas can comprise a slow moving carrier gas, and the charged droplets can be slowed in the slow moving carrier gas by viscous drag.

In an embodiment of the electrospray apparatus, the array of emitters can electro-spray an insulating liquid as the fog of the charged droplets by the addition of a charge control agent.

An embodiment of the electrospray apparatus can further include a coaxial droplet generator, and a volatile conducting liquid shell, wherein the array of cone-shaped emitters electro-sprays an insulating liquid as the fog of the charged droplets by the coaxial droplet generator with the volatile conducting liquid shell.

In another embodiment, an electrospray apparatus can include: an array of cone-shaped emitter that emits a fog of charged droplets, wherein the charged droplets are produced in a carrier gas by the array of emitters and directed into a development zone of a charge image, and wherein the array of emitters comprises a cone jet electrospray micro-array that produces a high liquid concentration of the charged droplets in the carrier gas.

In yet another embodiment, a method of operating an electrospray apparatus can involve: emitting a fog of charged droplets from an array of emitters, producing the charged droplets in a carrier gas by the array of emitters, and directing the charged droplets into a development zone of a charge image.

In an embodiment of the method, each emitter among the array of emitters can comprise a cone-shaped emitter.

In an embodiment of the method, the array of emitters can comprise a cone jet electrospray micro-array that can produce a high liquid concentration of the charged droplets in the carrier gas.

In an embodiment of the method, the charged droplets can comprise charged fountain solution droplets.

In an embodiment of the method, the charge image can comprise a fountain solution image that is transferrable to a blanket for control and subsequent ink transfer to a receiving medium.

In an embodiment of the method, the carrier gas can comprise a slow moving carrier gas, and the charged droplets can be slowed in the slow moving carrier gas by viscous drag.

In an embodiment of the method, the array of emitters can electro-spray an insulating liquid as the fog of the charged droplets by the addition of a charge control agent.

An embodiment of the method can further involve the use of a coaxial droplet generator, and a volatile conducting liquid shell, wherein the array of cone-shaped emitters can electro-spray an insulating liquid as the fog of the charged droplets by the coaxial droplet generator with the volatile conducting liquid shell.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An electrospray apparatus, comprising:

an array of cone-shaped emitters that emits a fog of charged droplets, wherein the charged droplets are produced in a carrier gas by the array of emitters and directed into a development zone of a charge image;

a coaxial droplet generator; and a volatile conducting liquid shell, wherein the array of cone-shaped emitters electro-sprays an insulating liquid as the fog of the charged droplets by the coaxial droplet generator with the volatile conducting liquid shell.

2. The electrospray apparatus of claim 1 wherein the array of cone-shaped emitters comprises a cone jet electrospray micro-array.

3. The electrospray apparatus of claim 1 wherein the array of cone-shaped emitters comprises a cone jet electrospray micro-array that produces a high liquid concentration of the charged droplets in the carrier gas.

4. The electrospray apparatus of claim 1 wherein the charged droplets comprise charged fountain solution droplets.

5. The electrospray apparatus of claim 1 wherein the charge image comprises a fountain solution image that is transferrable to a blanket for control and subsequent ink transfer to a receiving medium.

6. The electrospray apparatus of claim 1 wherein:

the carrier gas comprises a slow moving carrier gas; and the charged droplets are slowed in the slow moving carrier gas by viscous drag.

7. The electrospray apparatus of claim 1 wherein the array of cone-shaped emitters electro-sprays an insulating liquid as the fog of the charged droplets by an addition of a charge control agent.

8. The electrospray apparatus of claim 1 wherein the charged droplets are slowed in the carrier gas by viscous drag.

9. An electrospray apparatus, comprising:

an array of cone-shaped emitters that emits a fog of charged droplets, wherein the charged droplets are produced in a carrier gas by the array of cone-shaped emitters and directed into a development zone of a charge image, and wherein the array of cone-shaped emitters comprises a cone jet electrospray micro-array that produces a high liquid concentration of the charged droplets in the carrier gas;

a coaxial droplet generator; and a volatile conducting liquid shell, wherein the array of cone-shaped emitters electro-sprays an insulating liquid as the fog of the charged droplets by the coaxial droplet generator with the volatile conducting liquid shell.

10. The electrospray apparatus of claim 9 wherein the charged droplets comprise charged fountain solution droplets.

11. The electrospray apparatus of claim 9 wherein the charge image comprises a fountain solution image that is transferrable to a blanket for control and subsequent ink transfer to a receiving medium.

12. The electrospray apparatus of claim 9 wherein:

the carrier gas comprises a slow moving carrier gas; and the charged droplets are slowed in the slow moving carrier gas by viscous drag.

13. The electrospray apparatus of claim 9 wherein the array of emitters electro-sprays an insulating liquid as the fog of the charged droplets by an addition of a charge control agent.

14. The electrospray apparatus of claim 9 wherein the charged droplets are slowed in the carrier gas by viscous drag.

15. A method of operating an electrospray apparatus, comprising:

emitting a fog of charged droplets from an array of cone-shaped emitters;

producing the charged droplets in a carrier gas by the array of cone-shaped emitters;

directing the charged droplets into a development zone of a charge image; and wherein the array of cone-shaped emitters electro-sprays an insulating liquid as the fog of the charged droplets by a coaxial droplet generator with a volatile conducting liquid shell.

16. The method of claim 15 wherein the array of cone-shaped emitters comprises a cone jet electrospray micro-array.

17. The method of claim 15 wherein the array of cone-shaped emitters comprises a cone jet electrospray micro-array that produces a high liquid concentration of the charged droplets in the carrier gas.

18. The method of claim 15 wherein the charged droplets comprise charged fountain solution droplets.

19. The method of claim 15 wherein the charge image comprises a fountain solution image that is transferrable to a blanket for control and subsequent ink transfer to a receiving medium.

20. The method of claim 15 wherein:

the carrier gas comprises a slow moving carrier gas; and the charged droplets are slowed in the slow moving carrier gas by viscous drag.

* * * * *